United States Patent [19]

Gladieux

[11] 4,183,485
[45] Jan. 15, 1980

[54] MOUNTING BRACKET FOR A CYLINDRICAL MEMBER

[75] Inventor: Dennis M. Gladieux, Fort Wayne, Ind.

[73] Assignee: International Harvester Company, Chicago, Ill.

[21] Appl. No.: 945,354

[22] Filed: Sep. 25, 1978

[51] Int. Cl.[2] .................. F16L 3/22; A44B 21/00
[52] U.S. Cl. ................ 248/68 R; 24/81 CC; 403/389
[58] Field of Search .............. 248/68 R, 71, 74 R, 248/49; 403/389, 390, 391, 396; 174/40 CC, 164; 24/81 CC, 73 AP, 73 PB, 135 P

[56] References Cited

U.S. PATENT DOCUMENTS

| D. 250,877 | 1/1979 | Miavitz | D8/8 |
|---|---|---|---|
| 3,111,060 | 11/1963 | Peeling | 403/390 X |
| 3,191,723 | 6/1965 | Shoup | 403/389 X |
| 3,211,381 | 10/1965 | Rasmussen | 24/81 CC |
| 3,432,129 | 3/1969 | Santucci | 24/81 CC |
| 3,906,592 | 9/1975 | Sakasegawa | 24/81 CC |
| 4,037,810 | 7/1977 | Pate | 24/81 CC |
| 4,135,693 | 1/1979 | Miavitz | 248/339 |
| 4,136,913 | 1/1979 | Pietzsch et al. | 305/58 PC |

FOREIGN PATENT DOCUMENTS 803868  4/1951  Fed. Rep. of Germany ........ 24/81 CC

*Primary Examiner*—James T. McCall
*Attorney, Agent, or Firm*—Raymond E. Parks; Frederick J. Krubel; F. David AuBuchon

[57] ABSTRACT

A mounting bracket for securing two parallel spaced-apart cylindrical members to a supporting structure. The bracket comprises an oval shaped clip, of flexible material, which has opposite terminal ends extending towards and overlapping one another along one lateral side of the clip. Each cylindrical member is passed between the overlapping ends and is nested within a respective semi-cylindrical loop that is formed at the opposite longitudinal sides of the clip. The overlapping ends of the clip are then fastened to one another and attached to the supporting structure.

5 Claims, 4 Drawing Figures

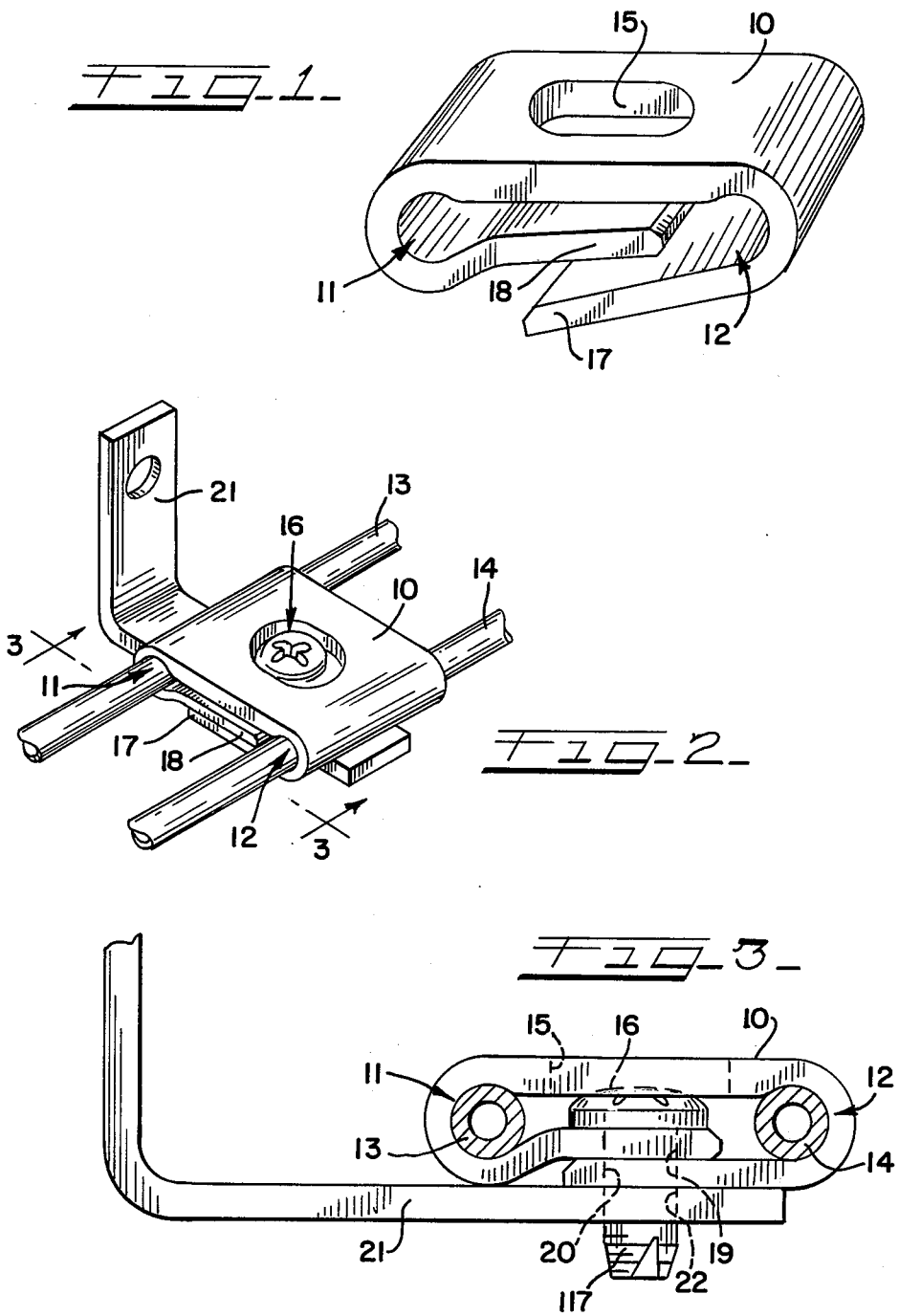

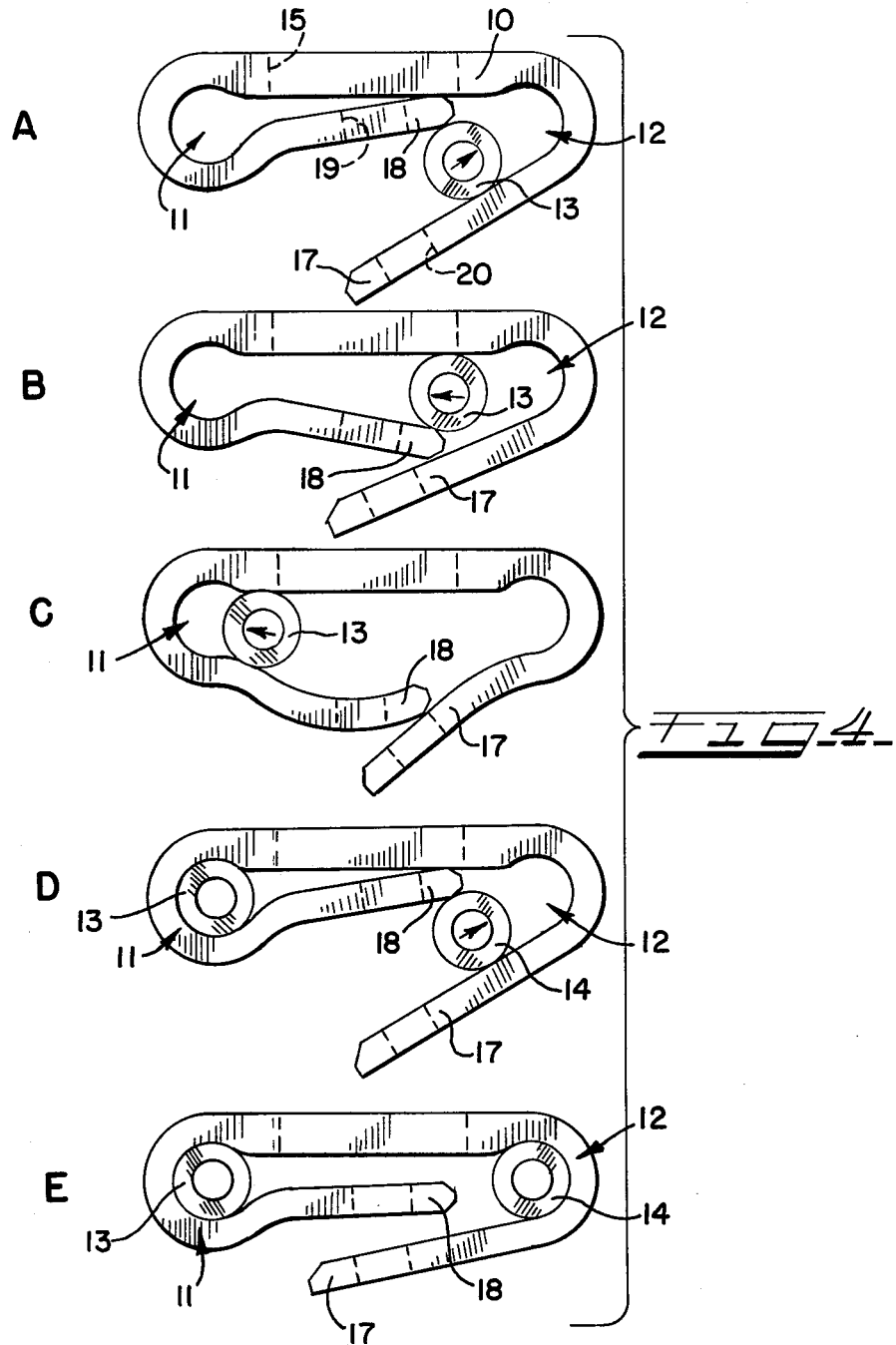

MOUNTING BRACKET FOR A CYLINDRICAL MEMBER

BACKGROUND OF THE INVENTION

This invention relates to a mounting bracket and more particularly to a mounting bracket for a cylindrical member such as a pipe, hose, wire or cable and the like. In particular the invention relates to a mounting bracket for securing two parallel spaced-apart tube members of a vehicle fluid braking system.

1. Field of the Invention

Motor vehicles employ fluids for various functions such as for fuel and for power actuation or control of remote systems such as the braking system. These fluids are transported throughout various areas of the motor vehicle by suitable conduits such as rigid tubing and flexible hoses. Such conduits are normally secured or anchored to various structures and frame members throughout the vehicle by suitable brackets or the like.

2. Description of the Prior Art

In U.S. Pat. No. 4,029,276—Zielie—June 14, 1977, there is disclosed a mounting bracket for securing a tubular member to a supporting frame. The bracket comprising a split omega shaped clip having a dovetail joint at the circular side and the legs of the omega forming tabs which provide means for securing the bracket to the supporting structure and the means for applying clamping pressure to the tubular member. In U.S. Pat. No. 4,063,334—Rohman—Dec. 20, 1977, there is disclosed a spring clip comprising a loop portion with two outwardly extending spring fingers. When the fingers are fastened to a support structure the loop portion embraces and supports a cylindrical element. The disadvantage of these two prior art structures is that only one cylindrical element can be secured by the mounting bracket. There is no provision for securing two parallel spaced-apart cylindrical members. Examples of prior art showing mounting brackets securing two cylindrical members are U.S. Pat. No. 3,432,129—Santucci—Mar. 11, 1969 and U.S. Pat. No. 3,963,065—Dauwalder—June 15, 1976. In the Santucci patent, there is no means shown which physically locks the ends of a split loop to one another to prevent an accidental opening of the loop once the cylindrical members are nested within the loop, and in the Dauwalder patent, only short lengths of cylindrical members may be contained within the loops of a bow like clip member. The overlapping tabs do not flex sufficiently to permit the insertion of cylindrical members between the lips of the tabs and the encapsulated nut which is held in place by the mounting bracket.

SUMMARY OF THE INVENTION

It is a primary object of the present invention to provide a mounting bracket for securing two parallel spaced-apart cylindrical members to a supporting structure.

Another object is to provide a bracket which comprises an oval shaped clip, of flexible material, which has opposite terminal ends extending towards and overlapping one another along one lateral side of the clip. Each cylindrical member is passed between the overlapping ends and is nested within a respective semi-cylindrical loop that is formed at the opposite longitudinal sides of the clip. The overlapping ends of the clip are then fastened to one another and attached to the supporting structure.

A further object of the present invention is to provide an improved mounting bracket for conduits and the like wherein the mounting bracket comprises a clip which is a one piece plastic extrusion with two nesting areas adapted to receive brake pipes. The clip has a clearance hole for a fastener to be inserted through and a hole in each overlapping leg of the proper size to allow a self-tapping fastener to cut a partial thread to ensure the integrity of the sub-assembly. The hole also allows the fastener to strip the threads in the clip while tapping threads in a clip extension during final assembly. The overlapping legs of the clip are distorted as the pipes are inserted. After the pipes are inserted in the loops of the clip, the memory of the material contains the pipes as the clip is adjusted to its designated location. The clip can be attached to an extension which can be fastened to the support structure or chassis of a vehicle or it can be assembled directly to the chassis of the vehicle with a single self-tapping screw.

BRIEF DESCRIPTION OF THE DRAWING

In order that the invention may be readily understood and put into practical effect, reference will now be made to the various figures of the drawing in which:

FIG. 1 is a perspective view of a mounting bracket in accordance with the present invention;

FIG. 2 is a perspective view of a sub-assembly of the mounting bracket of FIG. 1;

FIG. 3 is a view taken along lines 3—3 of FIG. 2; and

FIG. 4 is a series of views, A, B, C, D and E, showing the steps of inserting two parallel spaced-apart cylindrical members within the semi-cylindrical loops of the mounting bracket of FIG. 1.

DESCRIPTION OF THE PREFERRED EMBODIMENT

With reference to FIGS. 1, 2 and 3, there is shown a clip 10 which is constructed of a single plastic extrusion forming two nesting areas 11 and 12 which are designed to receive brake pipes 13 and 14. An opening 15 is provided in one lateral side of the clip which has sufficient clearance to receive the head 16 of a self-tapping screw 117. The other lateral side of the clip comprises the terminal ends 17 and 18 of the extrusion which extend toward and overlap one another. Holes 19 and 20 are provided in each overlapping leg which are of a proper size to allow the self-tapping fastener 117 to cut a partial thread therein and secure the overlapping legs 17, 18 to one another when fastened to the hanger 21 or directly to the chassis of the vehicle, not shown.

The assembly of the cylindrical member within the loop or nesting areas 11 and 12 of the clip will now be explained with reference to FIG. 4 and views A through E. In view 4A the cylindrical member 13 is shown being passed between the overlapping ends 17 and 18 of the clip 10 towards the nesting area or loop 12. As the tube 13 nests in the loop 12, the overlapping legs 17 and 18 relax and return to the undistorted state. The tube 13 is then pushed toward the other semi-circular loop 11 as shown in FIGS. 4B and 4C forcing the overlapping leg 18 against the leg 17. Once the tube 13 nests within the loop 11, as shown in FIG. 4D, the distorted overlapping legs return to the natural state and the above assembly process is repeated for conduit 14. That is, the overlapping legs or ends 17 and 18 are spread apart and conduit 14 is passed therebetween into the loop 12. Once the conduit 14 is nested within the loop 12, the memory of the plastic material contains the pipes 13 and 14. The self-tapping screw 16 is inserted in the opening 15 with the threaded end 117 passing through the holes 19 and 20 provided in the overlapping legs and into the bracket 21. The overlapping terminal ends of the ribbon like plastic extrusion are positively and mechanically locked to one another by the self-tapping screw so that they cannot be accidently pulled apart during assembly. The clip 10, with the locked overlapping legs 17, 18 can now be sled along the parallel tubes 13, 14 contained in the loops 11, 12 and positioned at any suitable mounting location on the body of the vehicle. Once the clip 10 is positioned at the selected mounting location, it is then fastened to either the bracket or hanger 21, as shown in FIG. 3, and the bracket fastened to the vehicle body, or the clip is fastened directly to the chassis or body, not shown, of the vehicle. The clip, therefore, provides a simple and relatively inexpensive means for retaining two parallel spaced-apart cylindrical members.

It is to be understood that the mounting bracket 10 can be used for connecting any two elements as appropriate, and the use thereof is not limited to the mounting of brake pipes to a motor vehicle frame.

What is claimed is:

1. A mounting bracket for securing two parallel spaced-apart cylindrical members to a supporting structure, comprising an oval shape clip, having opposite terminal ends extending toward and overlapping one another along one lateral side of the clip, the longitudinal sides of the clip forming semi-cylindrical loops adapted to nest the cylindrical members therein, and fastening means for fastening the overlapping ends of the clip to one another and for attaching the fastened clip ends to the supporting structure.

2. A mounting bracket as claimed in claim 1 wherein an opening is provided in the other lateral side of the clip, and a set of coaxially aligned holes are provided in the overlapping ends, the opening in said other lateral side being of a diameter to accept the passing of the head of a screw therethrough and the diameter of the set of holes in the overlapping ends being of a diameter to permit the passing of the shank of the screw therethrough.

3. A mounting bracket according to claim 2 and further including a hanger means for connecting the clip to the supporting structure, the hanger means having an opening of a diameter to permit the passage of the shank of the screw therethrough, and wherein the screw is a self-tapping screw tapping threads in the set of holes in the overlapping ends of the clip and in the opening in the hanger means.

4. A mounting bracket as claimed in claim 2, wherein, the head of the screw passes between the cylindrical members and contacts the innermost overlapping end of the clip, and wherein the shank of the screw is provided with self-tapping threads tapping threads in the set of holes in the overlapping ends of the clip and in a hole provided in the supporting structure, the head of the screw compressing the overlapping ends of the clip against the supporting structure.

5. A mounting bracket and method for securing two parallel spaced-apart cylindrical members to a supporting structure, comprising the steps of:

spreading apart overlapping inner and outer terminal ends of an oval shaped clip;

inserting one cylindrical member between the spread inner and outer terminal ends into a semi-circular loop formed at one end of the clip;

spreading the inner terminal end away from an opposite solid length of the clip to permit the passage of the one cylindrical member to another semi-circular loop formed at an opposite end of the clip;

passing the one cylindrical member between the spread inner terminal end into the other semi-circular loop;

spreading apart the overlapping inner and outer terminal ends of the clip;

inserting the second cylindrical member between the spread inner and outer terminal ends into the vacant semi-circular loop at the one end of the clip;

positioning the clip on the supporting structure by sliding the clip along the cylindrical members;

passing a self-tapping screw through an opening provided in the solid length of the clip between the semi-circular loops;

tapping threads in aligned holes provided in the overlapping inner and outer terminal ends and in the supporting structure;

tightening the head of the screw against the inner terminal end; and compressing the overlapping inner and outer terminal ends against the supporting structure.

* * * * *